(12) United States Patent
Hu et al.

(10) Patent No.: US 9,984,047 B2
(45) Date of Patent: May 29, 2018

(54) APPLICATION PAGE QUICK ACCESS

(71) Applicant: Alibaba Group Holding Limited, Grand Cayman (KY)

(72) Inventors: Yihao Hu, Hangzhou (CN); Yiteng Zhao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 25 days.

(21) Appl. No.: 15/154,563

(22) Filed: May 13, 2016

(65) Prior Publication Data

US 2016/0335231 A1 Nov. 17, 2016

(30) Foreign Application Priority Data

May 15, 2015 (CN) .......................... 2015 1 0250718

(51) Int. Cl.
*H04L 29/08* (2006.01)
*G06F 17/22* (2006.01)

(52) U.S. Cl.
CPC ...... *G06F 17/2235* (2013.01); *G06F 17/2247* (2013.01)

(58) Field of Classification Search
CPC .......... G06F 17/30884; G06F 17/2235; G06F 17/3089; G06F 17/241; G06F 17/30864; G06F 17/2247
USPC ...................................................... 715/206
See application file for complete search history.

(56) References Cited

U.S. PATENT DOCUMENTS 5,787,448 A * 7/1998 Anderson ............... G06F 9/543
715/205

6,564,254 B1 * 5/2003 Shoji ................. G06F 17/30864
345/168
2004/0030719 A1 2/2004 Wei
2009/0158212 A1 6/2009 Dykstra-Erickson et al.
2010/0281364 A1 * 11/2010 Sidman ............. G06F 17/30595
715/713

(Continued)

FOREIGN PATENT DOCUMENTS

WO WO2012145561 10/2012
WO WO 2015110042 A1 * 7/2015 ............. G06Q 50/01

OTHER PUBLICATIONS

PCT Search Report and Written Opinion dated Jul. 20, 2016 for PCT Application No. PCT/US16/32447, 9 Pages.

*Primary Examiner* — Scott T Baderman
*Assistant Examiner* — Hassan Mrabi
(74) *Attorney, Agent, or Firm* — Lee & Hayes, PLLC

(57) ABSTRACT

When an interaction barrier exists between an application A and an application B, if a jump link corresponding to the application B exists in a page of the application A, selection and replication operations are performed in the page of the application A, such that the content containing the above jump link is replicated into a clipboard of the system. Further when the user starts the application B, operations are executed to perform extraction and analysis on clipboard content to obtain the jump link, and generate a corresponding access trigger control. The access trigger control serves as a quick access portal, and it is only necessary for a user to click the access trigger control to implement jumping from a display page to a target page in the application B. Thus, the access efficiency is ensured, and the user is guaranteed to experience the relevant functions of the target page.

17 Claims, 4 Drawing Sheets

(56) References Cited

U.S. PATENT DOCUMENTS

| | | |
|---|---|---|
| 2013/0232451 A1 | 9/2013 | Chen et al. |
| 2014/0006129 A1 | 1/2014 | Heath |
| 2014/0108506 A1* | 4/2014 | Borzycki ............ H04L 67/1095 709/203 |
| 2014/0310746 A1 | 10/2014 | Larsen et al. |
| 2016/0294771 A1* | 10/2016 | Yuan ...................... G06Q 50/01 |

* cited by examiner

APPLICATION PAGE QUICK ACCESS

CROSS REFERENCE TO RELATED APPLICATION

The present disclosure claims the benefit of Chinese Patent Application Number 201510250718.0 filed May 15, 2015, entitled "METHOD AND MOBILE TERMINAL FOR APPLICATION PAGE QUICK ACCESS" which is hereby incorporated by reference in its entirety.

TECHNICAL FIELD

The present disclosure relates to the technical field of mobile applications, and, more particular, to an application page quick access method and a mobile terminal applying such method.

BACKGROUND

With the development of mobile communication technology and the popularity of mobile terminals such as mobile phones and tablet computers, there are more and more applications (App) applied for the mobile terminals, including various types of browsers, Taobao™ App, Weibo™ App, and so on. In the application process, when an external link is clicked in an interface of an application A, as compared with directly loading a page corresponding to the external link in the application A, if the page corresponding to the external link is loaded in an application B corresponding to the external link, the user may have better experiences with the relevant functions in the page of the external link.

In the conventional technologies, information interaction is generally utilized between different APPs to implement a quick access of the page in the application, which specifically includes the following steps: in an original App (equivalent to the above application A), opening a Uniform Resource Locator (URL) of the clicked external link; according to a mapping relationship between each App ID and a URL scheme stored in the system, searching for a target App (corresponding to the above application B) corresponding to the URL; if the corresponding target App is found, starting the target App and loading the target page corresponding to the above URL in the target App, and if no corresponding target App is found, directly loading the target page in a webpage browse control or webview built in the original App; wherein the above preset URL scheme may be a domain name of a website corresponding to the corresponding App, such that the target App may be searched according to a domain name part of the URL.

However, the premise on which the above external access method may be implemented is the smooth interaction between the original App and the target App. If the original App shields a URL link of the target App, or does not support processing the URL corresponding to other APPs through the preset URL scheme, the interaction between the original App and the target App is blocked. If the target page is loaded in the webpage browse control built in the original App, part of the functions are limited. Alternatively, if the target App is manually started by the user and the target page is searched for through operations such as searching, the page access efficiency is seriously affected.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In order to overcome the existing in the conventional techniques, the present disclosure provides an application page quick access method and a mobile terminal applying such method.

A first aspect of the present disclosure provides an application page quick access method; and the method includes:
  reading clipboard content in a system;
  determining whether a jump link exists in the clipboard content according to a preset format;
  when it is determined that the jump link exists in the clipboard content, determining whether the jump link satisfies a preset domain name rule corresponding to an application running in a foreground; and
  when it is determined that the jump link satisfies the preset domain name rule, generating and displaying an access trigger control according to the jump link, such that a user triggers the application to load a page corresponding to the jump link by clicking the access trigger control.

With reference to the first aspect, in a first feasible implementation of the first aspect, the quick access method further includes, after the access trigger control is displayed, updating a number of processing times of the jump link in the application.

With reference to the first feasible implementation of the first aspect, in the first feasible example embodiment of the first aspect, the quick access method further includes, when it is determined that the jump link exists in the clipboard content, determining whether the number of processing times of the jump link in the application is less than the preset number of processing times.

When it is determined that the jump link satisfies the preset domain name rule, generating and displaying an access trigger control according to the jump link includes, when it is determined that the jump link satisfies the preset domain name rule and the number of processing times of the jump link in the application is less than the preset number of processing times, generating and displaying the access trigger control according to the jump link.

With reference to the first aspect, or the first feasible implementation of the first aspect, or a second feasible implementation of the first aspect, in a third feasible implementation of the first aspect, the generating the access trigger control according to the jump link includes:
  determining whether a displayed access trigger control exists;
  if the displayed access trigger control exists, modifying a link associated with the displayed access trigger control as the jump link to obtain the access trigger control corresponding to the jump link; and
  if the displayed access trigger control does not exist, acquiring a control formatting rule, and generating an access trigger control corresponding to the jump link according to the control formatting rule.

A second aspect of the present disclosure provides a mobile terminal, and the mobile terminal includes:
  a clipboard read unit that reads clipboard content in a system;

a format filter unit that determines whether a jump link exists in the clipboard content according to a preset format;

a domain name filter unit that, when the format filter unit determines that the jump link exists in the clipboard content, determines whether the jump link satisfies a preset domain name rule corresponding to an application running in the foreground; and a trigger control display unit that, when the domain name filter unit determines that the jump link satisfies the preset domain name rule, generates and displays an access trigger control according to the jump link, such that a user triggers the application to load a page corresponding to the jump link by clicking the access trigger control.

With reference to the second aspect, in a first feasible implementation of the second aspect, the mobile terminal further includes a counter unit that, after the trigger control display unit generates and displays the access trigger control, updates the number of processing times of the jump link in the application.

With reference to the first feasible implementation of the second aspect, in a second feasible implementation of the second aspect, the mobile terminal further includes a jump limit unit that, when the format filter unit determines that the jump link exists in the clipboard content, determines whether the number of processing times of the jump link in the application is less than the preset number of processing times.

The trigger control display unit, for example, when the domain name filter unit determines that the jump link satisfies the preset domain name rule and the jump limit unit determines that the number of processing times of the jump link in the application is less than the preset number of processing times, generates and displays the access trigger control according to the jump link.

With reference to the second aspect, or the first feasible implementation of the second aspect, or a second feasible implementation of the second aspect, in a third feasible implementation of the second aspect, in order to implement generating the access trigger control according to the jump link, the trigger control display unit further:

determines whether the displayed access trigger control exists; if the displayed access trigger control exists, modifies a link associated with the displayed access trigger control as the jump link to obtain an access trigger control corresponding to the jump link; and if the displayed access trigger control does not exist, acquires a control formatting rule, and generates an access trigger control corresponding to the jump link according to the control formatting rule.

As shown from the above technical solution, an example embodiment of the present disclosure implements application page quick access based on clipboard content of the system. When an interaction barrier exists between an application A and an application B, and rapid access may not be implemented through the current method based on the interaction between APPs, if a jump link corresponding to the application B exists in a page of the application A, selection and replication operations are performed in the page of the application A, such that the content containing the above jump link is replicated into a clipboard of the system; and further when the user starts the application B, the technical solutions of this example embodiment is executed to perform extraction and analysis on clipboard content to obtain the jump link, and generate a corresponding access trigger control.

The access trigger control serves as a quick access portal, and it is only necessary for a user to click the access trigger control to implement jumping from a display page to a target page in the application B; thus, the access efficiency may be ensured, and the user may be guaranteed to completely experience the relevant functions of the target page.

It should be understood that the above general description and the details in the following description are merely examples and illustrative, and shall not limit the present disclosure.

BRIEF DESCRIPTION OF THE DRAWINGS

The drawings here are incorporated into the specification to constitute a part of this specification, which show the example embodiments of the present disclosure, and are used in combination with the specification to illustrate the principles of the present disclosure.

DETAILED DESCRIPTION

Figure 1:
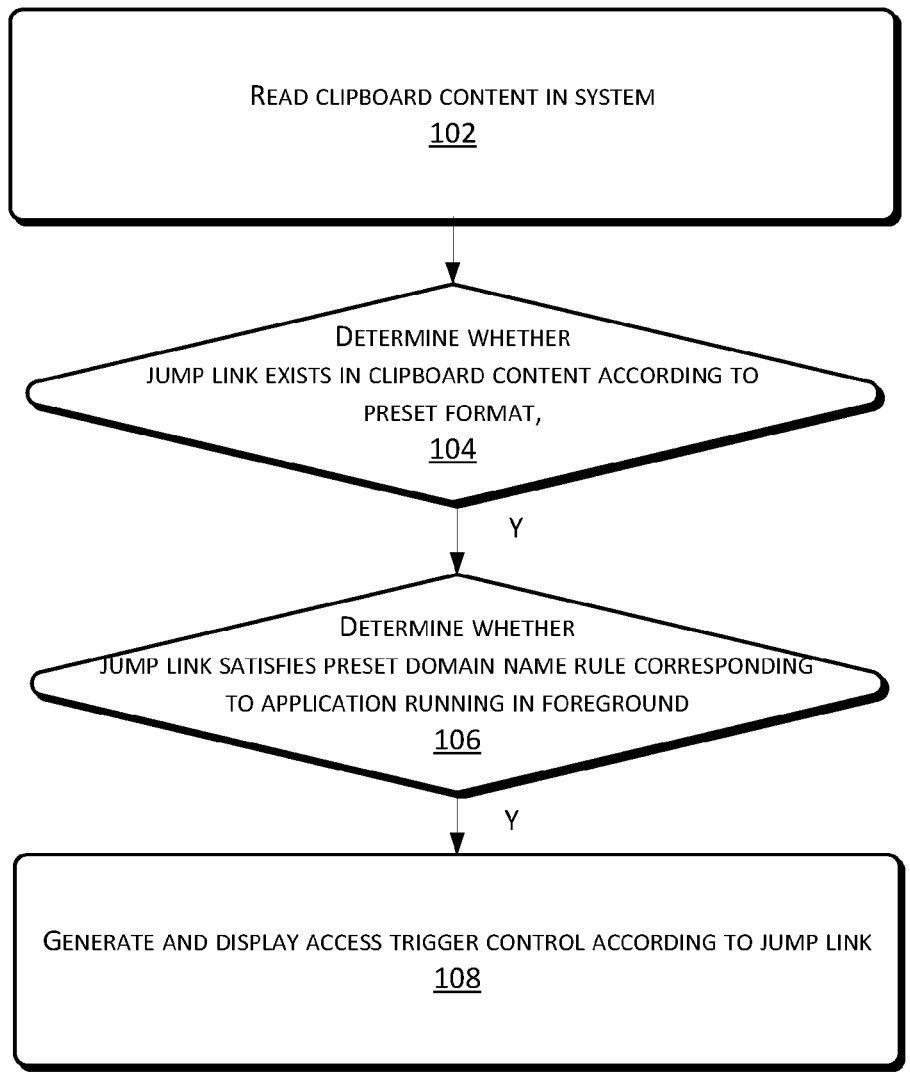
FIG. 1 is a flow chart of an example quick access method for an application page according to an example embodiment of the present disclosure.

The example embodiments are described in detail herein, which are illustratively expressed in the drawings. In the drawings, unless otherwise indicated, the same numbers in different drawings indicate the same or similar elements. The implementations described in the following example embodiments are only examples and do not represent all of the implementations of the present disclosure. Instead, they are only examples of the apparatus and method of some aspects of the present disclosure as stated in the claims in detail.

The application page quick access method according to an example embodiment of the present disclosure is used to quickly load a corresponding target page in an application B according to a link displayed in an application A and corresponding to the application B, and is particularly applicable to the case where an interaction barrier exists between the application A and the application B.

FIG. 1 is a flow chart of an example quick access method for an application page according to an example embodiment of the present disclosure. As shown FIG. 1, the method specifically includes the following operations.

At 102, clipboard content in a system is read.

At 104, whether a jump link exists in the clipboard content is determined according to a preset format, and if yes, the operation at 106 is performed; otherwise, this process ends.

The above preset format is used to filter out useless information in the clipboard content, and find fields that contain the jump link. The preset format may be flexibly configured according to actual needs. For example, the preset format may be configured as the following format "Access: xxxxxxxhttp://xxxx.com", that is, when a piece of content "Access: xxxxxxx http://xxxx.com" exists in the clipboard content, it is determined that the jump link (which is usually a URL corresponding to the target page) exists, and the string "http://xxxx.com" at the end of the piece of content is intercepted to obtain the jump link.

At 106, when it is determined that the jump link exists in the clipboard content, whether the jump link satisfies a preset domain name rule corresponding to an application running in the foreground is determined, if yes, the operation at 108 is performed; otherwise, this process ends.

The application running in the foreground, i.e., the application that is interacting with the user in a display window, may be a new application started by the user, and may also be an application waken up from running in the background to be running in the foreground.

A collection of valid domain names corresponding to the above application in the foreground is recorded in the preset domain name rule, and only if the jump link satisfies the preset domain name rule, i.e., the domain name part of the jump link is in the collection of legal domain names corresponding to the application in the foreground, the page corresponding to the jump link belongs to the pages in the application. The Taobao™ App, for example, corresponds to the preset domain name rule of "taobao.com." Thus, only if the domain name part in the jump link is "taobao.com", the subsequent operations may be further performed.

The above preset domain name rule may also be flexibly set according to practical application requirements, and specifically, for example, may be expressed by using a regular expression. For example, the regular expression is delivered and updated by configuring a channel to implement the modification of the preset domain name rule.

At 108, when it is determined that the jump link satisfies the preset domain name rule, an access trigger control is generated and displayed according to the jump link.

After the access trigger control is displayed, the user may trigger the application to load a target page corresponding to the jump link by clicking the access trigger control. Certainly, if the user does not want to access the target page, the user may directly shut off the access trigger control. After the access trigger control is clicked, the system may deal with the jump link according to the existing URL uniform navigation mechanism, and route to a page corresponding to the jump link and open the page.

In this example embodiment, the pattern of the access trigger control may also be flexibly set according to practical application requirements. For example, in order to reduce the blocking to the text content of the display interface, the access trigger control in this example embodiment may be set as the following button pattern: the button covers above a tool bar of the application, the height of the button is the same as the height of the tool bar, and the width of the button is the same as the width of the display interface.

In view of the above operations, an example embodiment of the present disclosure implements application page quick access based on clipboard content of the system, i.e., when an interaction barrier exists between an application A and an application B, and rapid access may not be implemented through the current method based on the interaction between APPs, if a jump link corresponding to the application B exists in a page of the application A, selection and replication operations are performed in the page of the application A, such that the content containing the above jump link is replicated into the clipboard of the system. Further when the user starts the application B, the operations under this example embodiment is executed to perform extraction and analysis on clipboard content to obtain the jump link, and generate a corresponding access trigger control. The access trigger control serves as a quick access portal, and it is only necessary for a user to click the access trigger control to implement jumping from a display page to a target page in the application B. Thus, the access efficiency is ensured, and the user is guaranteed to completely experience the relevant functions of the target page.

In one feasible example embodiment of the present disclosure, the corresponding implementation codes of the above quick access method may also be built in each application, and the above operations start to be performed when the application is in the state of running in the foreground, which are applicable for the App developers to improve their App products, and to improve the user experience.

In another feasible example embodiment of the present disclosure, the corresponding implementation codes of the above quick access method may be built in the operating system of a mobile terminal, such that the operating system controls and performs the above operations. In the case of controlling and performing by the operating system, the operations (e.g., the above steps 102 and 104) in the above method which are not necessarily associated with the application may be performed in advance, such that, when the application is in the state of running in the foreground, the subsequent operations associated with the application are further performed, thereby further enhancing the access speed.

In one feasible implementation of the present disclosure, the generating an access trigger control according to the jump link may include:
  whether a displayed access trigger control exists is determined;
  if the displayed access trigger control exists, a link associated with the displayed access trigger control is modified as the jump link to obtain the access trigger control corresponding to the jump link; and
  if the displayed access trigger control does not exist, a control formatting rule is acquired, and an access trigger control corresponding to the jump link is generated according to the control formatting rule.

As stated in the above operations, if the displayed access trigger control does not exist, it is necessary to acquire a control formatting rule to create an access trigger control satisfying the control formatting rule. When the displayed access trigger control exists, in order to simplify the operation, modification may be made directly on the basis of the displayed access trigger control to obtain the access trigger control corresponding to the jump link. For example, the link associated with the displayed access trigger control is modified as the jump link.

Figure 2:
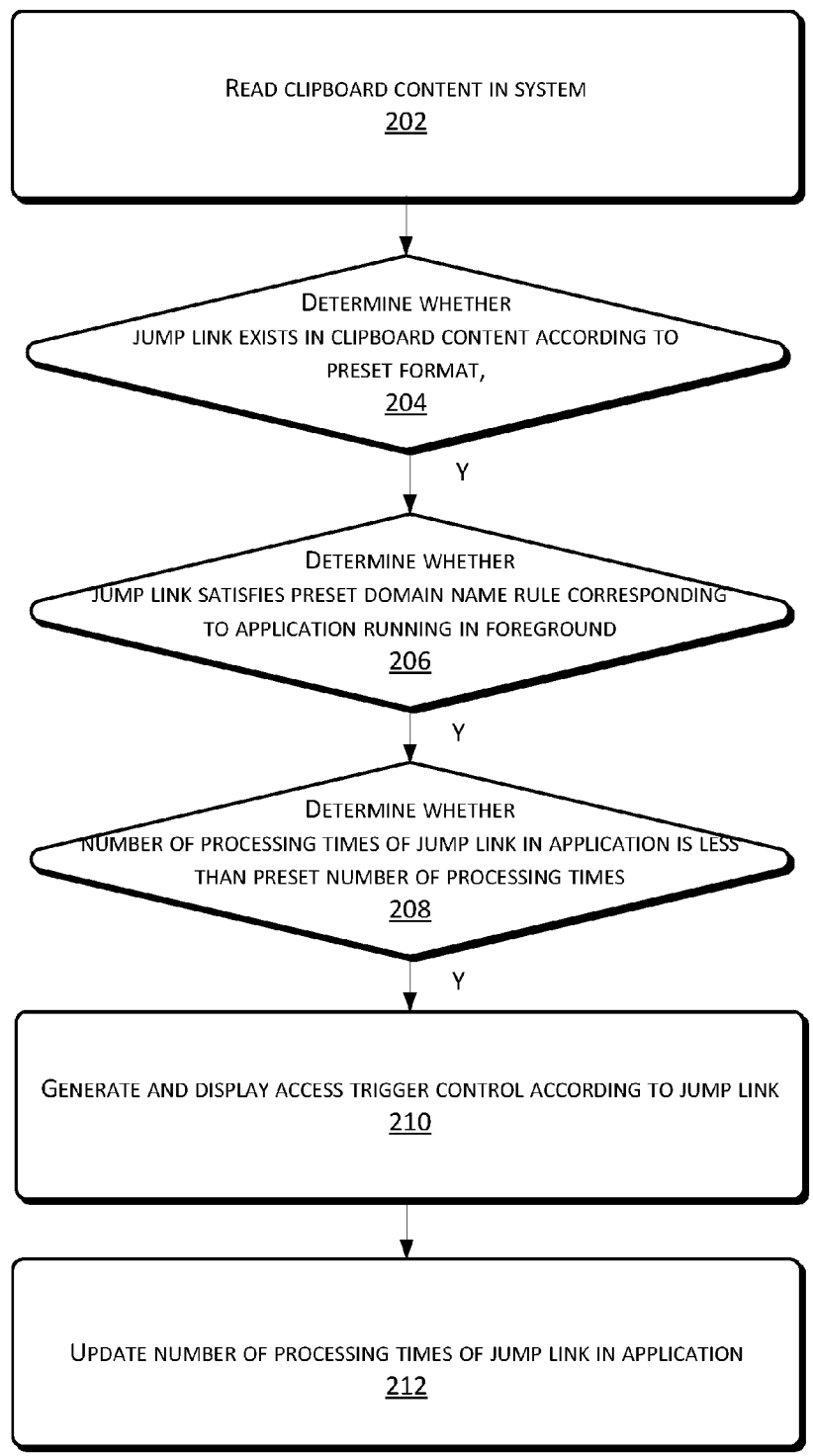
FIG. 2 is a flow chart of another example quick access method for an application page according to an example embodiment of the present disclosure.

In practical applications, on the basis of the example embodiment shown in FIG. 1, if the clipboard content is not updated, the same jump link may be identified and displayed many times, so that the user will open the same page multiple times, resulting in a waste of the user's time, and lowering the user experience. In view of this, an example embodiment of the present disclosure provides an example application page quick access method as shown in FIG. 2. With reference to FIG. 2, the method includes the following operations.

At 202, clipboard content in a system is read.

At 204, whether a jump link exists in the clipboard content is determined according to a preset format, and if yes, the operation at 206 is performed; otherwise, this process ends.

At 206, whether the jump link satisfies a preset domain name rule corresponding to an application running in the foreground is determined, if yes, the operation at 208 is performed; otherwise, this process ends.

At 208, whether a number of processing times of the jump link in the application is less than a preset number of processing times is determined, and if yes, the operation at 210 is performed; otherwise, this process ends.

At 210, when it is determined that the jump link satisfies the preset domain name rule and the corresponding number of processing times of the jump link is less than the preset number of processing times, the access trigger control is generated and displayed according to the jump link.

At 212 the number of processing times of the jump link in the application is updated.

In an example embodiment of the present disclosure, an initial value of the corresponding number of processing times of the jump link is 0, the corresponding access trigger control is displayed once. No matter whether the user clicks on or turns off the access trigger control, the corresponding number of processing times is increased by 1. Before the access processing control is generated and displayed, the number of times of displaying the corresponding access processing control may be determined according to the recorded number of processing times. If it exceeds the preset number of processing times, the control is no longer generated and displayed, thereby avoiding the situation that the user opens the same page multiple times. Generally, the above preset number of processing times is set to 1, that is, the access trigger control corresponding to the same jump link is only required to be displayed once to satisfy the practical application requirements.

It should be noted that, the sequence of execution of the domain name determining operation in the above operation 206 and the operation for determining the number of times at 208 are not limited to the above. For example, the operation at 208 may performed prior the operation at 206. Alternatively, the operations at 206 and 208 are performed simultaneously. Only when the two determining results are both yes (that is, the jump link satisfies the preset domain name rule and the number of processing times corresponding to the jump link is less than the preset number of processing times), the operation at 210 is performed to generate the access trigger control.

Figure 3:
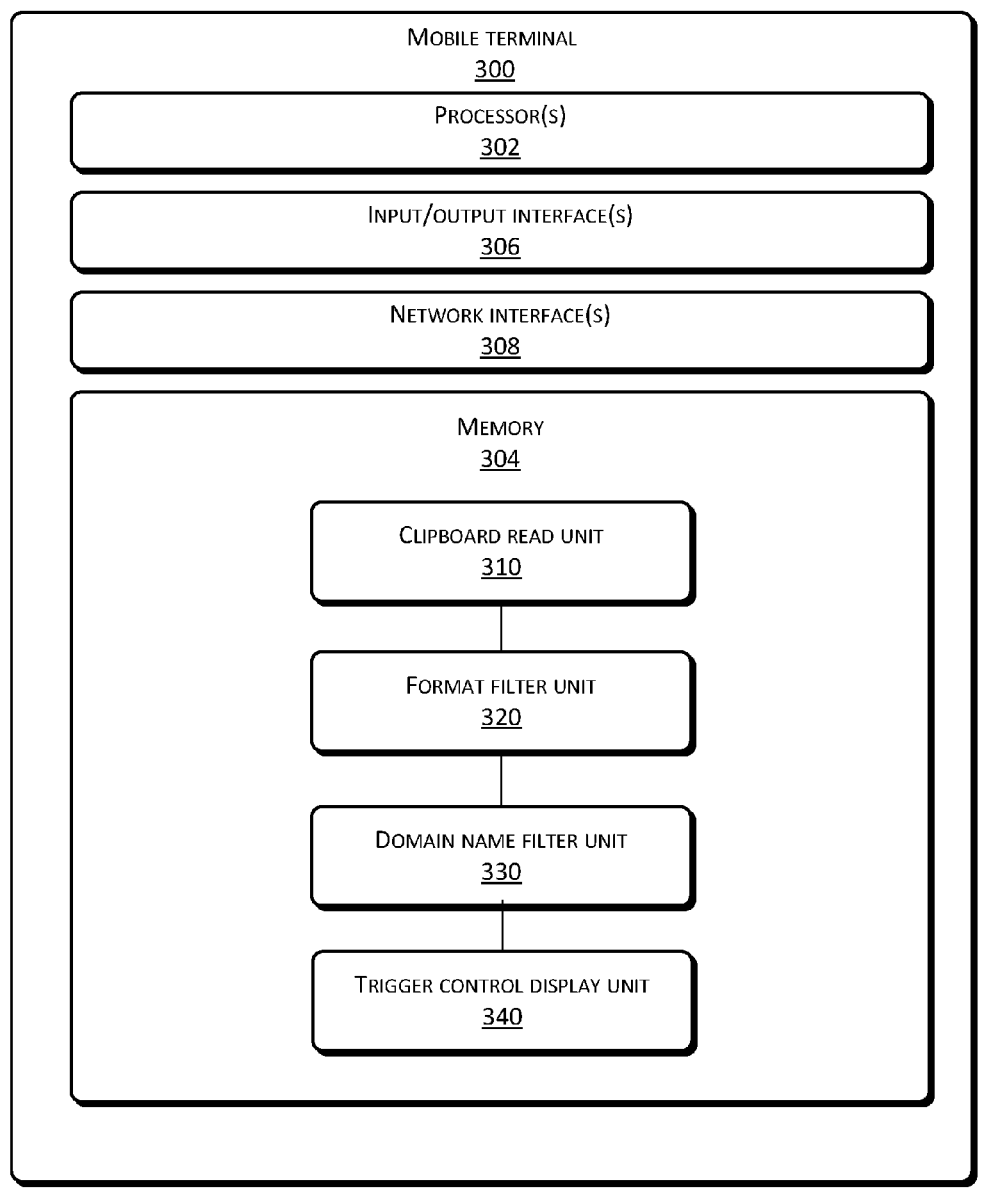
FIG. 3 is a structure diagram of an example mobile terminal according to an example embodiment of the present disclosure.

FIG. 3 is a structure diagram of an example mobile terminal 300 according to an example embodiment of the present disclosure. With reference to FIG. 3, the mobile terminal 300 includes one or more processor(s) 302 or data processing unit(s) and memory 304. The mobile terminal 300 may further include one or more input/output interface(s) 306, and network interface(s) 308. The memory 304 is an example of computer-readable media.

The computer-readable media includes volatile and non-volatile, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

The memory 304 may store therein a plurality of modules or units including a clipboard read unit 310, a format filter unit 320, a domain name filter unit 330, and a trigger control display unit 340.

The clipboard read unit 310 reads clipboard content in a system.

The format filter unit 120 determines whether a jump link exists in the clipboard content according to a preset format. Accordingly, the mobile terminal 300 may further include a format management unit (not shown in FIG. 3) that stores the preset format and allows modifying the stored preset format.

The domain name filter unit 330, when the format filter unit 320 determines that the jump link exists in the clipboard content, determines whether the jump link satisfies a preset domain name rule corresponding to an application running in the foreground. Accordingly, the mobile terminal 300 may further include a domain name management unit (not shown in FIG. 3) that stores the preset domain name rule and allows modifying the stored preset domain name rule.

The trigger control display unit 340, when the domain name filter unit 330 determines that the jump link satisfies the preset domain name rule, generates and displays an access trigger control according to the jump link, such that a user triggers the application to load a page corresponding to the jump link by clicking the access trigger control.

In view of the above structure, an example embodiment of the present disclosure implements application page quick access based on clipboard content of the system. That is, when an interaction barrier exists between an application A and an application B, and a rapid access may not be implemented through the current method based on the interaction between Apps, if a jump link corresponding to the application B exists in a page of the application A, selection and replication operations are performed in the page of the application A, such that the content containing the above jump link is replicated into the clipboard of the system. Further when the user starts the application B, the operations of this example embodiment are executed to perform extraction and analysis on clipboard content to obtain the jump link, and generate a corresponding access trigger control. The access trigger control serves as a quick access portal, and it is only necessary for a user to click the access trigger control to implement jumping from a display page to a target page in the application B. Thus, the access efficiency is ensured, and the user is guaranteed to completely experience the relevant functions of the target page.

In one feasible example embodiment of the present disclosure, in order to implement generating and displaying the access trigger control according to the jump link, the trigger control display unit 340 determines whether the displayed access trigger control exists. If the displayed access trigger control exists, a link associated with the displayed access trigger control is modified as the jump link to obtain an access trigger control corresponding to the jump link. If the displayed access trigger control does not exist, a control formatting rule is acquired, and an access trigger control corresponding to the jump link is generated according to the control formatting rule.

Figure 4:
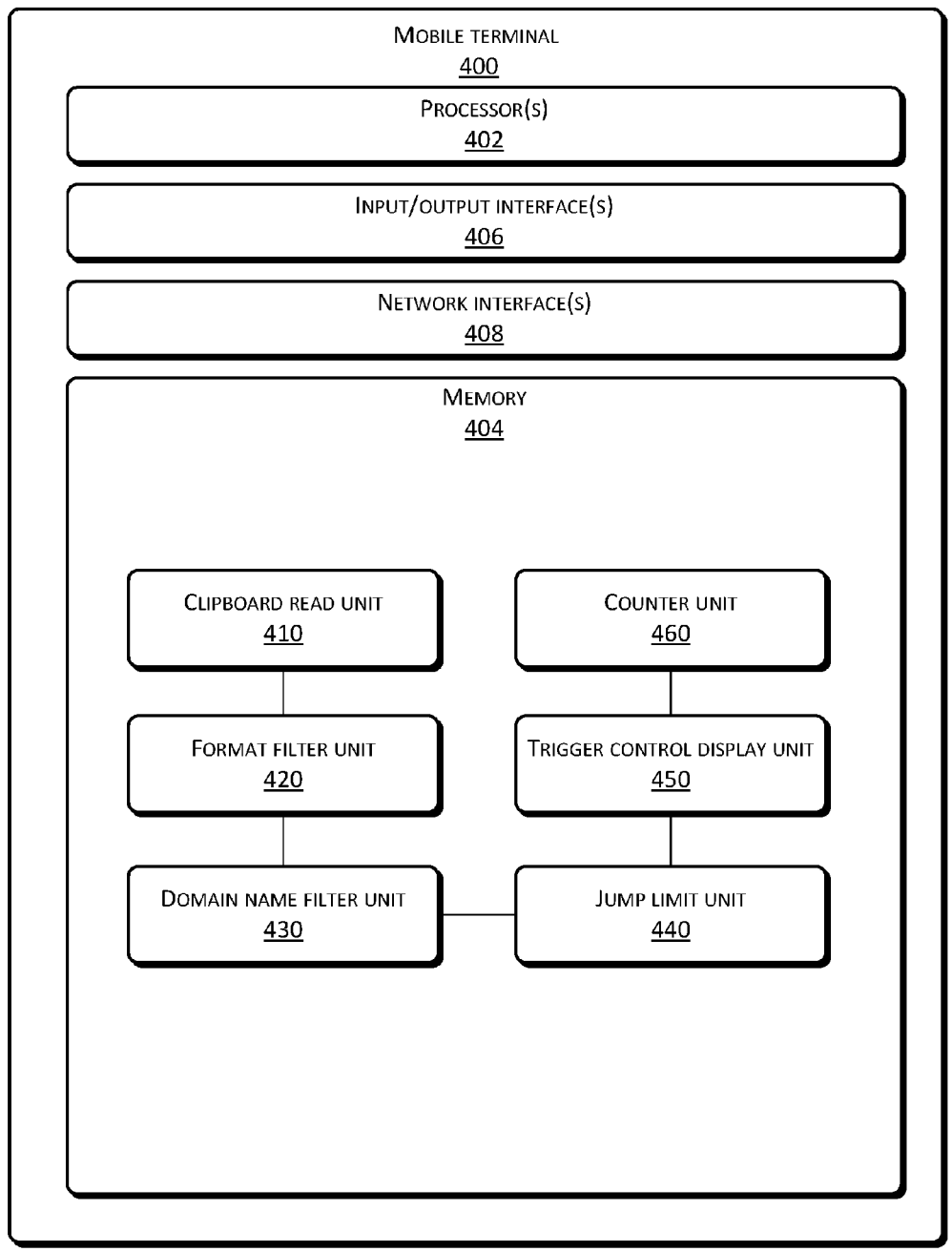
FIG. 4 is a structure diagram of another example mobile terminal according to an example embodiment of the present disclosure.

FIG. 4 is a structure diagram of another mobile terminal 400 according to an example embodiment of the present disclosure. With reference to FIG. 4, the mobile terminal 400 includes one or more processor(s) 402 or data processing unit(s) and memory 404. The mobile terminal 400 may further include one or more input/output interface(s) 406, and network interface(s) 408. The memory 404 is an example of computer-readable media.

The memory 404 may store therein a plurality of modules or units including a clipboard read unit 410, a format filter unit 420, a domain name filter unit 430, a jump limit unit 440, a trigger control display unit 450, and a counter unit 460.

The clipboard read unit 410 reads clipboard content in a system.

The format filter unit 420 determines whether a jump link exists in the clipboard content according to a preset format. Accordingly, the mobile terminal 400 may further include a format management unit (not shown in FIG. 4) that stores the preset format and allows modifying the stored preset format.

The domain name filter unit 430, when the format filter unit 420 determines that the jump link exists in the clipboard content, determines whether the jump link satisfies a preset domain name rule corresponding to an application running in the foreground. Accordingly, the mobile terminal 400 may further include a domain name management unit (not shown in FIG. 4) that stores the preset domain name rule and allows modifying the stored preset domain name rule.

The jump limit unit 440, when the format filter unit 420 determines that the jump link exists in the clipboard content, determines whether a number of processing times of the jump link in the application is less than a preset number of processing times.

The trigger control display unit 450, when the domain name filter unit 430 determines that the jump link satisfies the preset domain name rule and the jump limit unit 440 determines the number of processing times of the jump link in the application is less than the preset number of processing times, generates and displays an access trigger control according to the jump link, such that the user triggers the application to load the page corresponding to the jump link by clicking the access trigger control.

The counter unit 460, after the trigger control display unit 450 generates and displays the access trigger control, updates the number of processing times of the jump link in the application.

In view of the above, as compared with the example embodiment shown in FIG. 3, the mobile terminal 400 shown in FIG. 4, by using the trigger control display unit 450 and a counter unit 460, controls the number of times of displaying the access control page corresponding to the same jump link, thereby avoiding the situation that the user repeatedly opens the same page multiple times.

With respect to the apparatus in the above example embodiment, the specific manner of implementing the operation by each module has been described in detail in the relevant example method embodiments, which is not illustrated in detail herein.

After considering the specification and implementing the disclosure in the specification, a person skilled in the art may easily conceive of other implementation solutions of the present disclosure. The present disclosure is intended to cover any modifications, usages, or adaptive variations of the present disclosure, and such modifications, usages, or adaptive variations follow the general principles of the present disclosure and include the common knowledge or common technical solutions in this technical field that are not disclosed by the present disclosure. The specification and the above embodiments are only examples, and the protection scope of the present disclosure shall be indicated by the following claims.

Multiple example embodiments of the present disclosure has been described in the present disclosure, and it should be understood by those skilled in the art that the example embodiments of the present disclosure may be combined with one another. In addition, those skilled in the art shall know that various modifications and variations may be made to the present disclosure without departing from the spirit of the present disclosure, and it is intended that the appended claims encompass these modifications and variations without departing from the spirit of the present disclosure.

What is claimed is:

1. A method, comprising:
   reading a clipboard content in a system;
   determining that a jump link exists in the clipboard content according to a preset format;
   determining that the jump link satisfies a preset domain name rule corresponding to an application running in foreground;
   determining that a number of processing times of the jump link in the application is less than a preset number of processing times; and
   generating and displaying an access trigger control according to the jump link.

2. The method of claim 1, further comprising triggering the application to load a page corresponding to the jump link after determining that the access trigger control is triggered.

3. The method of claim 2, wherein the determining that the access trigger control is triggered includes determining that the access trigger control is clicked.

4. The method of claim 1, further comprising updating the number of processing times of the jump link in the application after the access trigger control is displayed.

5. The method of claim 1, wherein the generating and displaying the access trigger control includes:
   determining that a displayed access trigger control exists; and
   modifying a link associated with the displayed access trigger control as the jump link to obtain the access trigger control corresponding to the jump link.

6. The method of claim 1, wherein the generating and displaying the access trigger control includes:
   determining that a displayed access trigger control does not exist;
   acquiring a control formatting rule; and
   generating the access trigger control corresponding to the jump link according to the control formatting rule.

7. A mobile terminal comprising:
   one or more processors;
   memory;
   a clipboard read unit stored in the memory and executable by the one or more processors that reads a clipboard content in a system;
   a format filter unit stored in the memory and executable by the one or more processors that determining whether a jump link exists in the clipboard content according to a preset format;
   a domain name filter unit stored in the memory and executable by the one or more processors that, when the format filter unit determines that the jump link exists in the clipboard content, determines whether the jump link satisfies a preset domain name rule corresponding to an application running in foreground; and
   a trigger control display unit stored in the memory and executable by the one or more processors that, when the domain name filter unit determines that the jump link satisfies the preset domain name rule and a number of processing times of the jump link in the application is less than a preset number of processing times, generates and displays an access trigger control according to the jump link.

8. The mobile terminal of claim 7, wherein the trigger control display unit further triggers the application to load a page corresponding to the jump link after determining that the access trigger control is triggered.

9. The mobile terminal of claim 8, wherein the trigger control display unit further determines that the access trigger control is clicked.

10. The mobile terminal of claim 8, further comprising a counter unit that, after the trigger control display unit generates and displays the access trigger control, updates the number of processing times of the jump link in the application.

11. The mobile terminal of claim 10, further comprising a jump limit unit that, when the format filter unit determines that the jump link exists in the clipboard content, determines whether the number of processing times of the jump link in the application is less than the preset number of processing times.

12. The mobile terminal of claim 8, wherein the trigger control display unit further:
   determines that the displayed access trigger control exists; and
   modifies a link associated with the displayed access trigger control as the jump link to obtain an access trigger control corresponding to the jump link.

13. The mobile terminal of claim 8, wherein the trigger control display unit further:
   determines that the displayed access trigger control does not exist;
   acquires a control formatting rule; and
   generates the access trigger control corresponding to the jump link according to the control formatting rule.

14. One or more memories stored thereon computer-executable instructions, executable by one or more processors, to cause the one or more processors to perform acts comprising:
   reading a clipboard content in a system;
   determining that a jump link exists in the clipboard content according to a preset format;
   determining that the jump link satisfies a preset domain name rule corresponding to an application running in foreground;
   determining that a number of processing times of the jump link in the application is less than a preset number of processing times; and
   generating and displaying an access trigger control according to the jump link.

15. The one or more memories of claim 14, wherein the acts further comprise triggering the application to load a page corresponding to the jump link after determining that the access trigger control is triggered.

16. The one or more memories of claim 15, wherein the determining that the access trigger control is triggered includes determining that the access trigger control is clicked.

17. The one or more memories of claim 14, wherein the acts further comprise updating the number of processing times of the jump link in the application after the access trigger control is displayed.

* * * * *